United States Patent [19]

Frommelt et al.

[11] Patent Number: 5,622,016

[45] Date of Patent: Apr. 22, 1997

[54] GUTTER AND SEAL ASSEMBLY

[75] Inventors: Robert J. Frommelt, Peosta; William Triervieler; David J. Hoffmann, both of Dubuque, all of Iowa; Kenneth F. Lenz, Cuba City, Wis.; Thomas J. Medley; Thomas J. Boffeli, both of Dubuque, Iowa

[73] Assignee: Rite-Hite Corporation, Milwaukee, Wis.

[21] Appl. No.: 133,410

[22] Filed: Oct. 7, 1993

[51] Int. Cl.$^6$ ............................. F04H 14/00; F06B 1/56
[52] U.S. Cl. ................. 52/173.2; 52/2.12; 52/11
[58] Field of Search ............... 52/11, 173.2, 2.12; 160/19, 38, 39, 127

[56] References Cited

U.S. PATENT DOCUMENTS

| | | |
|---|---|---|
| Re. 28,391 | 4/1975 | Frommelt et al. ............ 52/173.2 |
| 688,595 | 12/1901 | Coe ............................. 52/11 |
| 1,008,491 | 11/1911 | Pruden ........................ 52/11 |
| 2,627,912 | 2/1953 | Soppeland ................... 160/39 |
| 2,704,574 | 3/1955 | Etlar . |
| 2,764,236 | 9/1956 | Dye . |
| 3,095,886 | 7/1963 | Frommelt et al. . |
| 3,216,433 | 11/1965 | D'Azzo . |
| 3,352,314 | 11/1967 | Frommelt et al. ............ 52/173.2 |
| 3,375,625 | 4/1968 | Edkins et al. ................ 52/173.2 |
| 3,403,489 | 10/1968 | Frommelt et al. . |
| 3,500,599 | 3/1970 | Sciolino ...................... 52/173.2 |
| 3,557,508 | 1/1971 | Frommelt et al. . |
| 3,613,324 | 10/1971 | Conger . |
| 3,665,997 | 5/1972 | Smith et al. . |
| 3,939,614 | 2/1976 | Frommelt et al. . |
| 4,062,157 | 12/1977 | Potthoff . |
| 4,381,631 | 5/1983 | Frommelt . |
| 4,574,542 | 3/1986 | Klevnjans .................... 52/173.2 |
| 4,750,299 | 6/1988 | Frommelt et al. . |
| 4,799,342 | 1/1989 | Klevnjans .................... 52/173.2 |
| 4,825,607 | 5/1989 | Frommelt et al. . |
| 4,873,801 | 10/1989 | Winters ....................... 52/173.2 |
| 5,125,196 | 6/1992 | Moody . |

OTHER PUBLICATIONS

"Super Seal Dock Seals", catalog 11160/SU, Super Seal Mfg. Ltd., no date listed.

*Primary Examiner*—Carl D. Friedman
*Assistant Examiner*—Kevin D. Wilkens
*Attorney, Agent, or Firm*—Leydig, Voit & Mayer, Ltd.

[57] ABSTRACT

A seal assembly, which minimizes or eliminates infiltration of rain water along the roof of a truck parked in a loading dock, generally comprises a downwardly inclined roof panel which extends outwardly from the building wall and collects the water. A gutter member, supported by and disposed along the length of the roof panel, collects water runoff from the building walls and the roof panel and channels the water away from the center of the door opening and towards either side of the loading dock opening. The seal assembly also comprises a seal member mounted to the roof panel and/or the gutter member so that it generally hangs into the upper portion of the door opening and engages the top portion of the truck so as to sealably engage the truck roof and form a water blocking barrier, thereby minimizing or eliminating infiltration of rain water along the truck roof. In one embodiment, the seal member comprises a fabric curtain which is suspended into the path of the incoming truck and drapes over the truck roof to form a seal therewith. In another embodiment, the seal member comprises a resilient, compressible and deformable seal pad, pivotally suspended from the roof panel and/or the gutter member, into the path of the incoming truck and for engaging the roof and/or the top rear peripheral edges of the truck and thereby form a barrier to rain, snow, air and the like.

18 Claims, 4 Drawing Sheets

GUTTER AND SEAL ASSEMBLY

FIELD OF THE INVENTION

The present invention relates generally to loading dock seal assemblies for use with a truck parked in a loading dock and, more particularly, to a seal assembly for minimizing rain infiltration into the truck, the loading dock or the building.

BACKGROUND OF THE INVENTION

Trucks are typically backed into or in close proximity to a loading dock or other opening in a building wall to facilitate loading and unloading of the truck. Since the width of the dock opening is typically larger than the truck width so that vehicles of different sizes can be readily serviced, a gap is formed between the loading dock walls and the truck which exposes the interior of the building to the outside weather and permits rain and cold air to enter the dock opening and the building. Attempts to seal the interior of the building from the outside environment have included loading dock shelters which utilize fabric or sheet material to form walls or curtains between the opening and the truck and loading dock seals which utilize resilient, compressible pad members, generally disposed at the lateral and top edges of the opening, to sealably engage the walls or rear edges of the truck. Some of the typical loading dock seals have square, beveled, wedge-shaped or L-shaped seals on the side.

In both loading dock seals and shelters, it has been common to use a head curtain supported by a header frame assembly to seal the gap between the truck roof and the top of the loading dock door so as to accommodate different truck sizes, door sizes, or truck orientations relative to the loading dock where seals may not be practical. In such applications, a common problem is the rain water which infiltrates between the head curtain and the top of the truck, into the rear truck opening, the loading dock, or the building. Such infiltration of water may cause serious problems including unsafe and slippery operating conditions, damage to materials being loaded and unloaded into the truck and damage to the building and loading dock facilities. The rain water typically originates from the water runoff down the side of the building and the header assembly of the loading dock. The rain runoff is also collected on the roof of the truck and is aggravated by sloped driveways found in many loading docks.

OBJECTS AND SUMMARY OF THE INVENTION

It is an object of the present invention to provide an improved seal assembly for a loading dock which minimizes or prevents infiltration of rain along the top of a truck parked in the loading dock.

It is a specific object of the present invention to provide a seal assembly which minimizes or prevents water runoff from the header assembly or the building from infiltrating along the roof of the truck.

Another object of the present invention is to provide a seal assembly which minimizes or prevents water runoff from the top of the truck from infiltrating the truck, loading dock or building.

It is another object of the invention to provide a seal assembly which sealably engages the uneven surface configurations of the truck.

It is another object of the invention to provide a seal assembly which sealably engages the truck regardless of the truck body width, the driveway incline, or off-center or skewed positions of the truck body relative to the loading dock opening.

Still another object of the present invention is to provide a seal assembly which functions in an efficient and practical manner, is easily and economically manufactured and assembled and is adapted for operation with vehicles of various widths and heights.

In accordance with certain objects of the invention, a seal assembly is provided which minimizes or eliminates infiltration of rain water along the roof of the truck. The seal assembly generally comprises a downwardly inclined roof curtain panel which extends outwardly from the building wall and collects the water, a gutter member disposed along the length of the roof panel which collects water runoff from the building walls and the roof panel and channels the water away from the center of the door opening and towards either side of the loading dock opening. The seal assembly may also comprise a seal member which is disposed so as to sealably engage the truck roof and form a rain-blocking barrier, thereby minimizing or eliminating infiltration of rain water along the truck roof.

The seal assembly is supported directly against the building wall by a mounting member. Extending outwardly from the mounting member is a fabric curtain and a plurality of stays sewn into pockets in the roof curtain. The stays are disposed along the width of the seal assembly and act as a frame assembly to generally support and extend the roof curtain in an outwardly and downwardly inclined orientation relative to the building wall so as to direct the rain water to the gutter member.

The gutter member is supported by the roof panel and disposed so that it collects the rain water from the roof panel and deflects the water away from the door opening and the truck roof. The ends of the gutter member extend past the sides of the truck and preferably past the sides of the door opening so that the water does not enter the door opening. The gutter member preferably has a channel-shaped cross section. The gutter member may be attached to the roof panel by bolting the gutter member to the stays.

The seal member is mounted to the roof panel and/or the gutter member so that it generally hangs into the upper portion of the door opening and generally engages the top portion of the truck. In one embodiment, the seal member comprises a fabric curtain which is suspended into the path of the incoming truck so that it drapes over the truck roof to form a seal therewith. In another embodiment, the seal member comprises a seal pad, sometimes referred to as a rhino nose, pivotally suspended from the roof panel and/or the gutter member, into the path of the incoming truck and for engaging the roof and/or the top rear peripheral edges of the truck. The seal pad is a resilient, compressible and deformable pad-like member adapted to compressibly and sealably engage the top of the truck parked in the loading dock and thereby form a barrier to rain, snow, air and the like. In response to the rearward movement of the truck into the loading dock, the rear peripheral edges of the truck engage the seal pad, thereby compressing and deforming the seal pads against the roof and the rear peripheral edges of the truck, and sealing the gap between the truck and the loading dock. Since it is desirable to maximize the surface area of the seal pad which deformably engages the truck in order to maximize the effectiveness of the seal, it has been found that a triangular configuration having an angular face adapted to sealably engage the truck, and horizontal and vertical legs is particularly effective. The seal pad may have a reinforcing member to minimize and prevent sagging.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
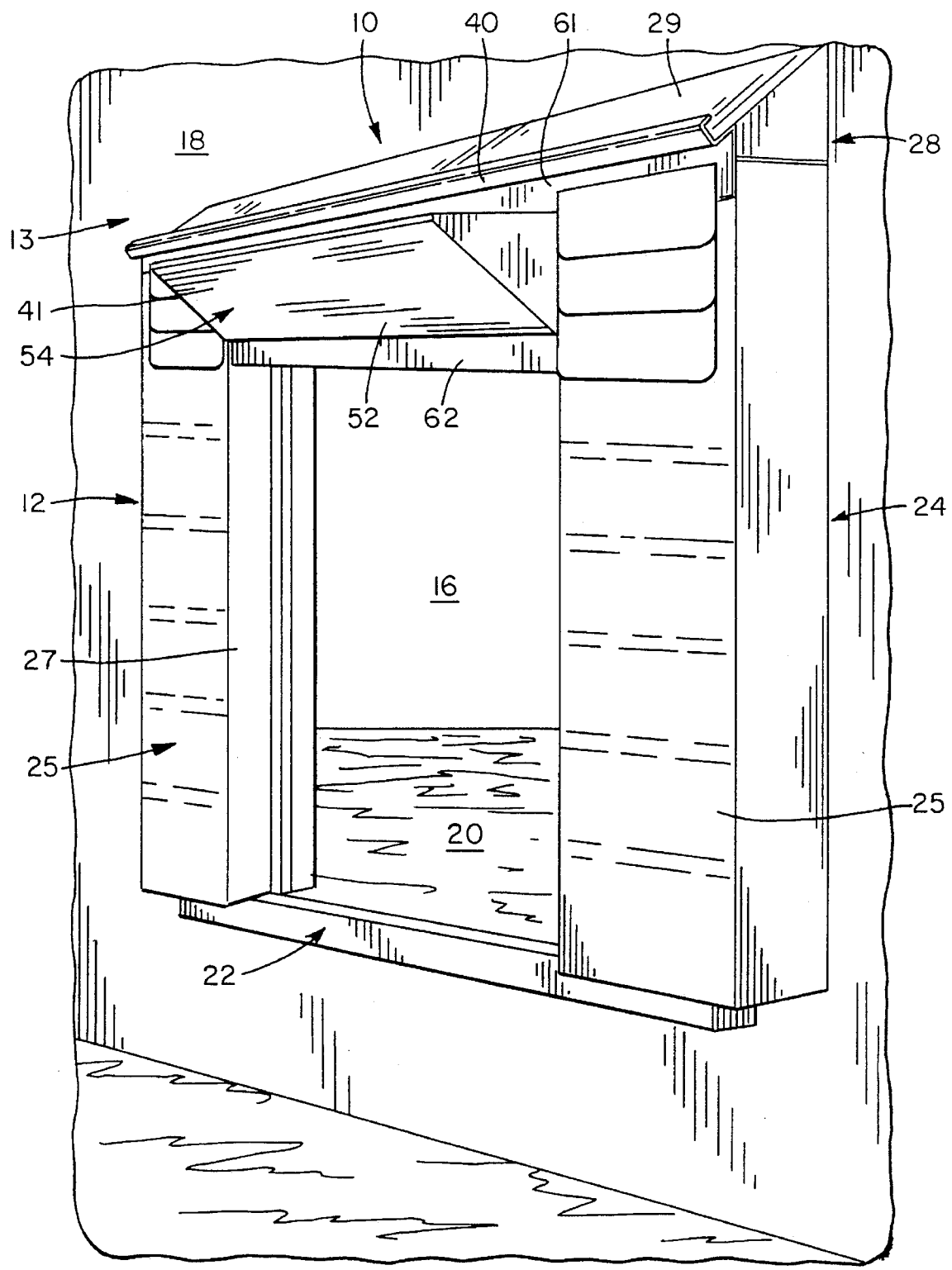
FIG. 1 is a perspective view of a loading dock having one embodiment of a seal assembly in accordance with the present invention.

Referring to the drawings, and more particularly to FIG. 1, one embodiment of a seal assembly 10, in accordance with the present invention, is mounted to a conventional loading dock 12 normally provided in buildings 13, warehouses, truck terminals, manufacturing plants and the like where raw materials and products are received and/or dispatched by trucks 14.

The conventional loading dock 12 normally has a dock opening 16 in a building wall 18 and a horizontal surface or deck 20 over which loading equipment such as forklift trucks and the like and dock personnel maneuver during loading and unloading operations. The dock 12 may be provided with a dock leveler (not shown) which is adapted to compensate for height differentials between the deck 20 and the upper supporting surface of the truck bed. The loading dock 12 has a vertical wall 22 against which the rear end of the truck 14 abuts during the loading and unloading operations. The wall 22 may be provided with suitable bumpers (not shown) which are engaged by the rear of the truck 14, thereby preventing damage or defacement of either the dock 12 or the truck 14 when the truck 14 backs into a parked position.

In the illustrated embodiment, a loading dock shelter 24 is mounted to the loading dock 12, although the present invention may also be utilized in a doorway 16 without a loading dock shelter 24. The loading dock shelter 24 comprises two side frames 25 disposed about the sides of the door opening 16 and which extends outwardly from the building wall 18 for providing a rigid structure for supporting a curtain 27. The curtain 27 generally projects into the door opening 16 to engage the truck 14 parked in the loading dock 12. The loading dock shelter 24 is intended to provide an air-blocking seal between the dock opening 16 and the lateral edges of the truck 14 to prevent the infiltration of air, outdoor elements, debris, vermin and the like into the truck 14 or the building 13, especially during the loading and unloading operation. Thus, when the truck 14 parks in the loading dock 12 for loading and unloading, an air-blocking seal is formed in response to engagement of the rear peripheral vertical side edges of the truck 14 and the loading dock shelter 24.

A conventional header assembly 28 may be mounted at the top side of the door opening 16 and comprises an inclined roof 29 having top end 29a mounted to the building wall 18 and a bottom end 29b generally disposed over the top of the truck 14 and a curtain (such as the type illustrated in FIG. 5 as curtain 50) freely suspended so as to engage the roof 14a of the truck 14. It will be appreciated that rain water will run down the side of the building 13 to the header roof 29 and fall onto the roof 14a of the truck 14. Additional water will also collect on the roof 14a of the truck 14. Such water may infiltrate between the curtain and the truck roof 14a and fall into the truck 14, the loading dock 12, and the interior of the building 13. This problem is aggravated when the truck 14 is parked in an inclined loading dock.

In accordance with certain objects of the invention, a seal assembly 10 is provided which minimizes or eliminates infiltration of rain water along the roof 14a of the truck 14. The seal assembly 10 generally comprises a roof panel 29, a gutter member 40 disposed along the length of the roof panel 29 which collects water runoff from the building walls 18 and the header roof 29 and channels the water away from the center of the door opening 16 and towards either side of the loading dock opening 16. The seal assembly 10 may also comprise a seal member 41 which is disposed so as to sealably engage the truck roof 14a and form a rain-blocking barrier, thereby minimizing or eliminating infiltration of rain water along the truck roof 14a. The seal member 41 generally hangs into the upper portion of the door opening 16 and is adapted to generally engage the top portion of the truck 14a. Or, as shown in the illustrated embodiments, the seal assembly may comprise the combination of the roof panel 29, the gutter member 40 and the seal member 41.

Figure 2:
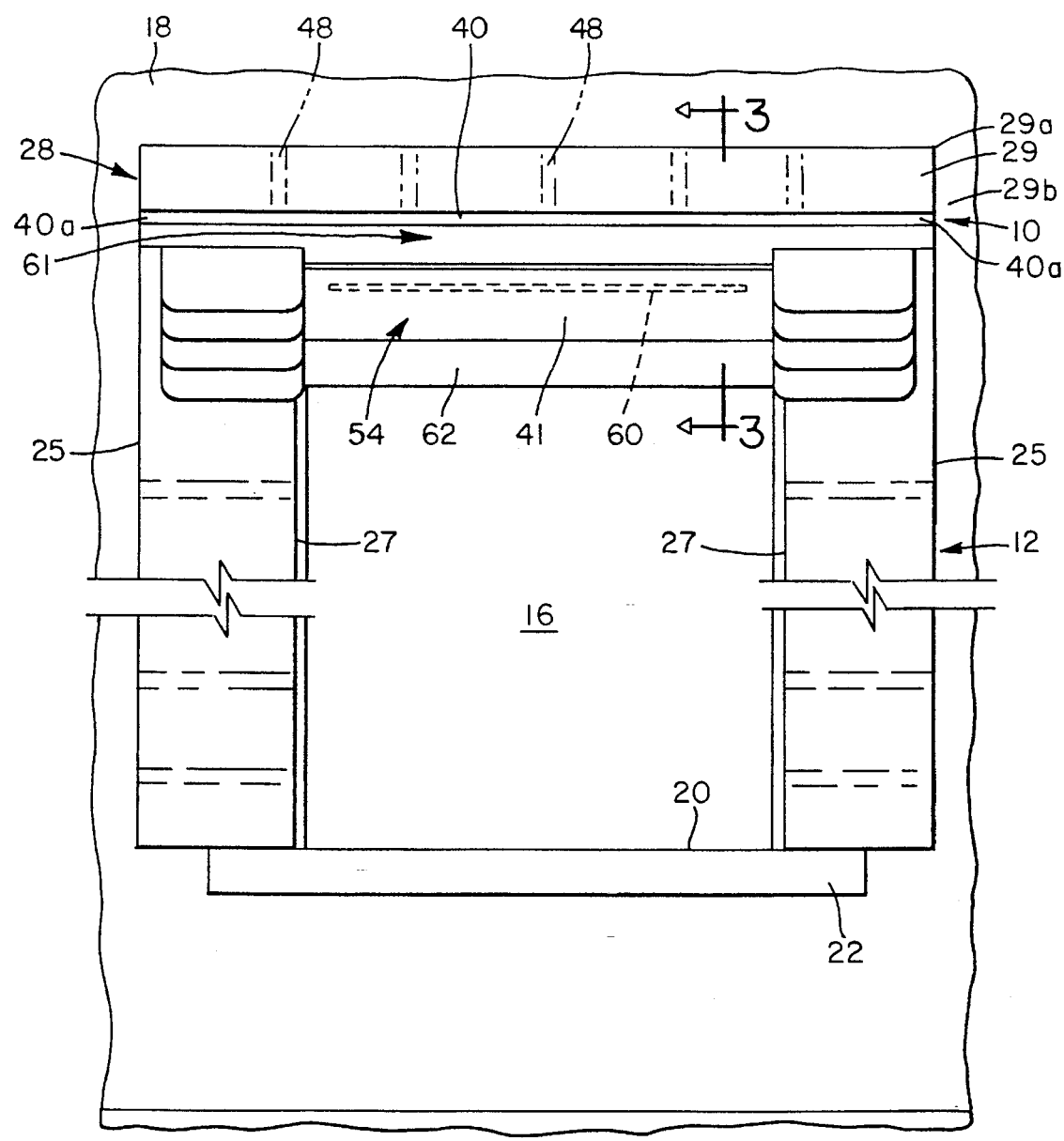
FIG. 2 is a front view of the loading dock shown in FIG. 1.

The seal assembly 10 is generally mounted at or above the top of the door opening 16 and generally above the shelter curtains 27 which are mounted to the building wall 18 in a conventional manner as shown in FIG. 1. In the illustrated embodiments, the seal assembly 10 comprises a downwardly inclined roof panel 29 which extends outwardly from the building wall 18 and collects the water. The seal assembly 10 is supported directly against the building wall 18 by a mounting member 46 such as a board or other rigid material. Extending outwardly from the mounting member 46 is a fabric curtain and a plurality of stays 48 sewn into pockets in the curtain which form the roof 29 of the seal assembly 10. The stays 48 are disposed along the width of the seal assembly 10 (as shown in FIG. 2) and act as a frame assembly to generally support and extend the roof curtain 29 in an outwardly and downwardly inclined orientation relative to the building wall 18 so as to direct the rain water to the gutter member 40. The top end 29a of the roof curtain 29 may be mounted to the mounting member 46 by any suitable method as will be known to those skilled in the art, including, for example, with bolts and the like for screwing the gutter member into the stays. It will be appreciated that the roof panel 29 may be fabricated from any suitable material which forms a barrier to the outside environment and which supports the gutter member 40 and the vertical seal member 41.

The gutter member 40 is supported by the roof panel 29 and disposed so that it collects the rain water from the roof panel 29 and deflects the water away from the door opening 16 and the truck roof 14a. Referring to FIG. 2, it will be seen that the ends 40a of the gutter member 40 extend past the sides of the truck 14 and preferably past the side of the door opening 16 so that the water does not enter the door opening 16. The gutter member 40 preferably has a channel-shaped cross section with a bight portion 40b in an almost vertical orientation and the legs 40c directed rearwardly towards the wall 18 in an almost horizontal orientation. It will, of course, be appreciated that other cross-sectional shapes may be utilized which are adapted to collect water run-off from the roof panel 29 and deflect it past the outer sides of the door opening 16 and away from the truck roof 14a. The gutter member 40 may be fabricated from any suitable material including, for example, metal such as aluminum, rubber, plastic and the like. The gutter member 40 may be attached to the roof panel 29 by any suitable method including, for example, bolting the gutter member 40 to the stays 48. In another embodiment, the roof panel 29 and the gutter member 40 may hang vertically from the building wall 18 into the door opening 16, instead of the inclined orientation illustrated in the figures.

The seal member 41 of the seal assembly 10 is flexibly and pivotally suspended from the roof panel 29 and/or the gutter member 40 so as to engage the top of the truck 14 to form a seal therewith. In one embodiment illustrated in FIG. 5, the seal member 41 comprises a conventional fabric curtain 50 which is suspended into the path of the incoming truck 14. The curtain 50 drapes over the truck roof 14a to form a seal therewith. The width of the curtain 50 substantially spans the width of the door opening 16 and the truck 14.

Figure 3:
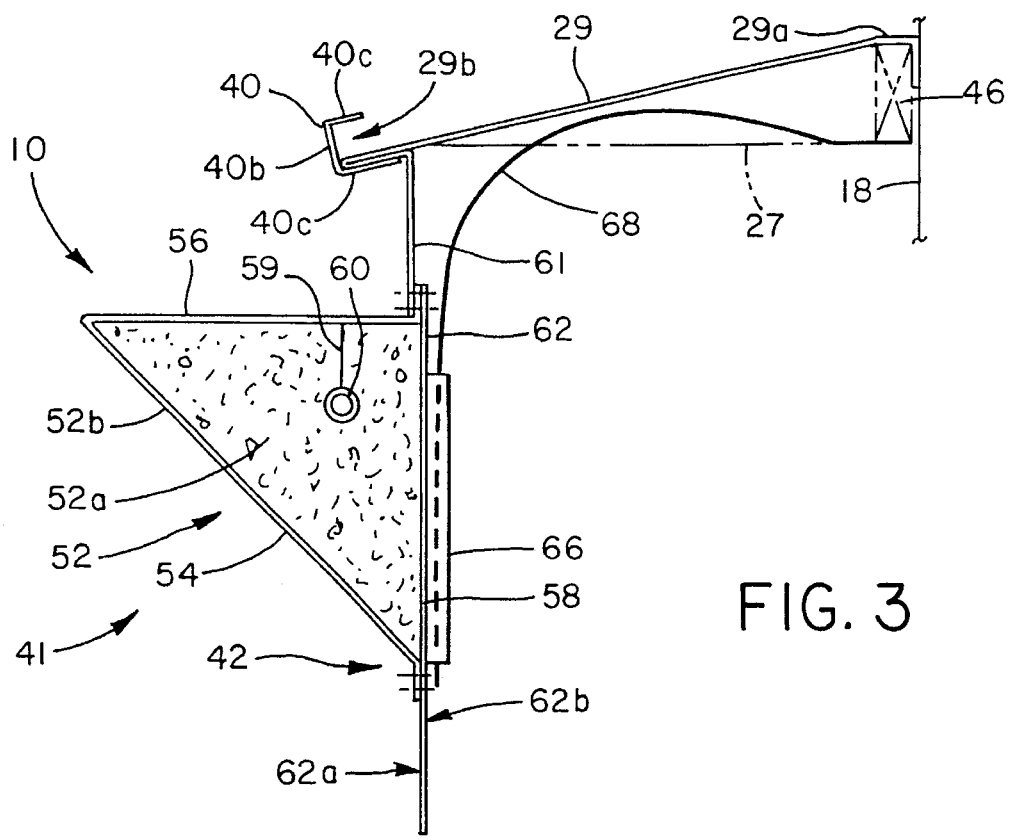
FIG. 3 is a cross-sectional view of the seal assembly taken along line 3—3 in FIG. 2 without a truck parked in the loading dock.
Figure 4:
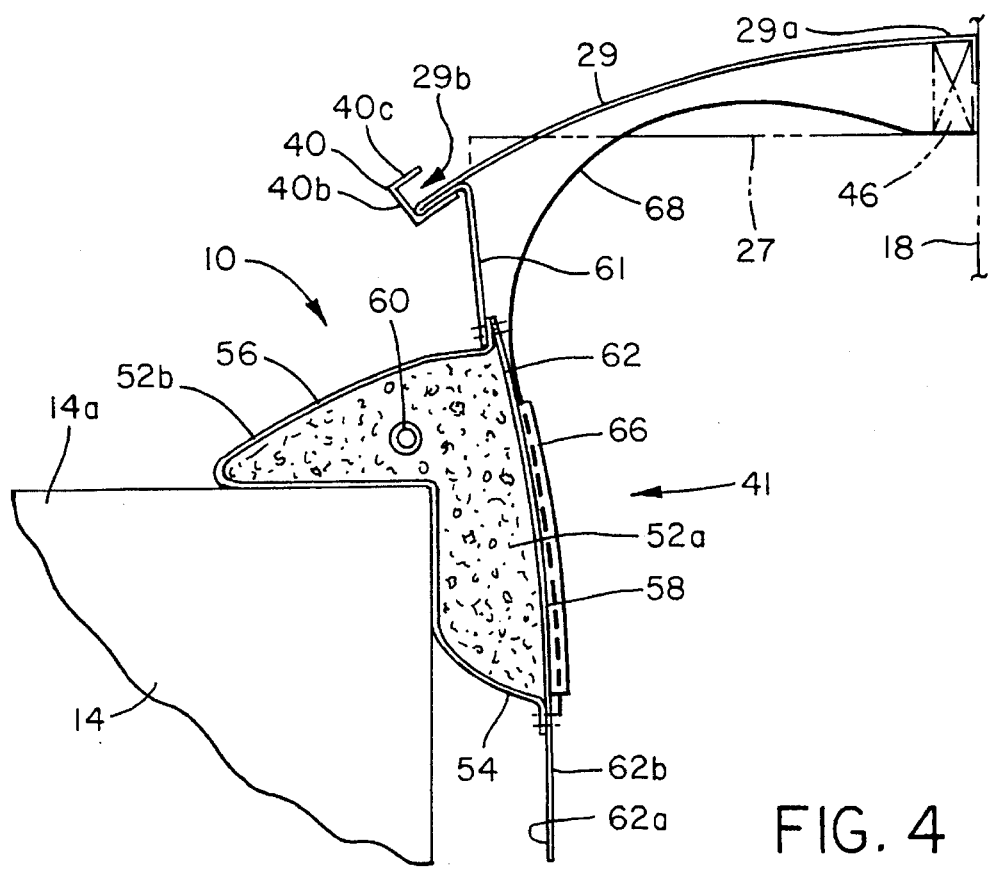
FIG. 4 is a cross-sectional view of the seal assembly taken along line 3—3 in FIG. 2 with a truck parked in the loading dock and the seal assembly engaging the top of the truck.

In another embodiment illustrated in FIGS. 1–4, the seal member 41 comprises a seal pad 52, sometimes referred to as a rhino nose, pivotally suspended from the roof panel 29 and/or the gutter member 40, into the path of the incoming truck 14 (as shown in FIG. 3) and for engaging the roof 14a and/or the top rear peripheral edges of the truck 14 (as shown in FIG. 4). The seal pad 52 is a resilient, compressible and deformable pad-like member adapted to compressibly and sealably engage the top of the truck 14 parked in the loading dock 12 and thereby form a barrier to rain, snow, air and the like. Thus, the width of seal pad 52 should extend substantially the entire width of the door opening 16 as shown in FIG. 2. In response to the rearward movement of the truck 14 into the loading dock 12, the rear peripheral edges of the truck engage the seal pad 52, thereby compressing and deforming the seal pad 52 against the roof 14a and the rear peripheral edges of the truck 14, and sealing the gap between the truck 14 and the loading dock 12. The seal pad 52 is preferably fabricated from a resilient, compressible and deformable foam-like core 52a such as, for example, urethane foam and the like and a waterproof, abrasion resistant cover 52b such as sold under the name HYPALON and may have any shape and configuration which is suitable to form the proper seal with the truck 14. Since it is desirable to maximize the surface area of the seal pad 52 which deformably engages the truck 14 in order to maximize the effectiveness of the seal, it has been found that a triangular configuration as illustrated in the figures is particularly effective. The seal pad 52 has an angular face 54 adapted to sealably engage the truck 14, and horizontal and vertical legs 56, 58. The seal pad 52 may have a horizontal reinforcing member 60 disposed in a groove 59 of the seal pad 52 to minimize and prevent sagging. In the illustrated embodiment, a rigid bar 60 is disposed in a slot in the core of the seal pad 52.

The seal assembly 10 may comprise a fabric curtain which extends from the mounting member 46 to the bight 40b of the gutter member 40 and is lapped back under the stays 48 to provide a first vertical curtain section generally depicted as 61. A second curtain section 62, attached to the first curtain section 61 by any suitable method, including for example, stitching or the like, is suspended downwardly to the full extent of the seal assembly 10 for engagement with the truck 14. It will be appreciated that the second curtain section 62 is, thus, flexibly mounted for pivotal movement in response to the rearward and forward movement of the truck 14 into and out of the loading dock 16. The seal pad 52 may be attached to front side 62a of the second curtain 62 by stitching, adhesive or any other suitable method. It is desirable that the seams of the seal pad 52 be properly sealed to insure that the seal pad 52 is waterproof, for example, the seams of the first curtain section 61 may overlap the seams of the seal pad 52. It will be appreciated that the seal pad 52 may also be attached to a single curtain (not shown) which is suspended from the gutter member 40 or the roof panel 29. The backside 62b of the second curtain section 62 may have pockets generally depicted as 66 sewn on its backside 62b to receive a plurality of resilient, arcuate-shaped stays 68 which are attached to the mounting member 46. The stays 68 act to support the second curtain 62 and the seal pad 52 and resiliently bias the seal pad 52 to an outwardly spaced position relative to the building wall 18, as generally shown in FIG. 2, so as to be in the path of the incoming truck 14. The arcuate portion of the stays 68 may also act to provide additional support for the first curtain 61.

Figure 5:
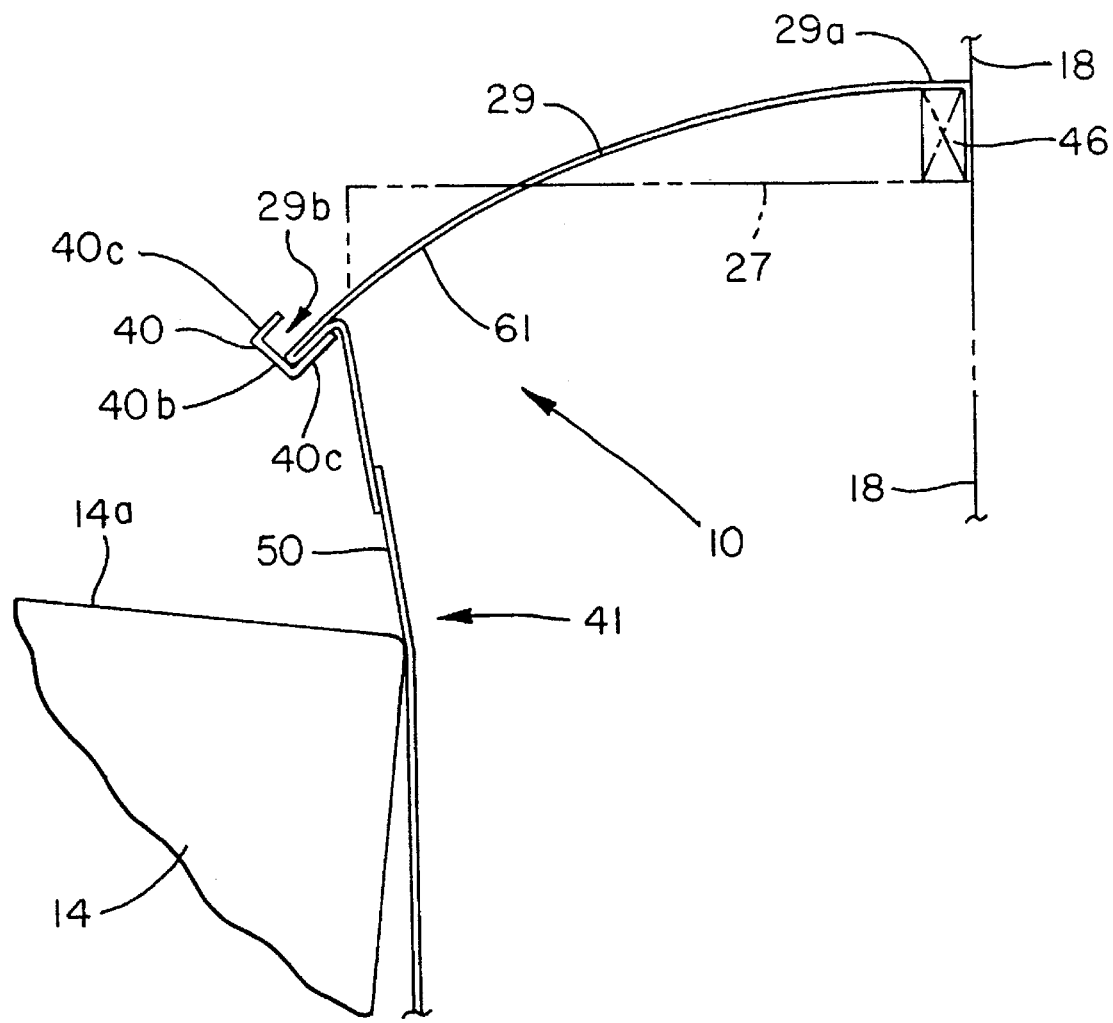
FIG. 5 is a cross-sectional view of the seal assembly similar to FIG. 4 but showing another embodiment of the seal assembly.

In operation, the seal member 41 is generally suspended in a vertical downward orientation such that it projects into the path of the incoming truck 14 and may pivotally engage the roof 14a of a truck 14 parked in the loading dock 12 as generally depicted in FIGS. 4 and 5. As the rearwardly moving truck 14 engages the angular face 54 of the seal pad 52, the curtains 61 and 62 are deflected rearwardly and the seal pad 52 is compressed and deformed about the top surface of the truck roof 14a and/or the top, rear peripheral edge of the truck 14. The resilient arcuate stays 68 may also bias the seal pad 52 into sealing engagement with the truck 14. The seal formed between the angular face 54 of the seal pad 52 and the truck roof 14a minimizes or eliminates infiltration of moisture and the like along the truck roof 14a. Since the seal pad 52 is pivotally suspended by the curtains 61, 62, the seal pad 52 may accommodate different size trucks and door sizes. Similarly, the seal pad 52 may accommodate trucks 14 which are parked in a skewed orientation relative to the center of the door opening 16 or which are parked in angled or inclined grades or driveways found in many loading docks 12. If necessary, the resilient stays 48 forming the frame assembly for the roof panel 29 also permit the roof panel 29 and the gutter member 40 to flex downwardly in response to engagement with the truck 14 as shown in FIGS. 4 and 5.

The roof panel 29 of the seal assembly 10 acts as a canopy and prevents infiltration. The gutter member 40 collects water runoff from the unprotected building wall 18 and the roof panel 29 and channels the water to either side of the door opening 16 and the truck roof 14a, thereby reducing the fluid load onto the truck roof 14a and enhancing the effectiveness of the seal between seal pad 52 and truck roof 14a.

When the truck 14 leaves the loading dock 12, the seal pad 52 resiliently returns to its uncompressed triangular cross-sectional configuration and the arcuate stays 68 bias the seal pad 54 to its downwardly suspended position for the next incoming truck 14.

Thus, it will be seen that a seal assembly 10 and related sealing devices have been provided which attain the aforenoted objects. Various additional modifications of the described embodiments of the invention as described herein will be apparent to those skilled in the art, particularly in light of the teachings of this invention. Thus, while a preferred embodiment of this invention has been disclosed, it will be appreciated that it is not limited thereto, but may be otherwise embodied within the scope of the following claims.

We claim as our invention:

1. A dock seal assembly for use with a truck parked adjacent a dock opening in a building wall and the dock opening defined by a top side and opposing side walls, the truck having a roof and a rear peripheral edge, the seal comprising:

a gutter member attached to the dock opening so as to collect water runoff from the dock opening and deflect the water away from the roof of the truck and the dock opening and a resilient, compressible seal member pivotally suspended from the top side of the dock opening so as to engage the truck wherein the seal member has a front face adapted to sealably engage the edge of the truck and a reinforcement member disposed inside the seal member and along at least a portion of the width of the seal member to prevent sagging of the seal member.

2. A dock seal assembly as set forth in claim 1 wherein the seal member has a triangular cross section defined by the front face which is adapted to sealably engage the truck and two side faces which are adapted to be attached to a curtain member.

3. A dock seal assembly as set forth in claim 1 comprising a resilient biasing member disposed between the seal member and the wall, one end of said biasing member engaging the seal member so as to bias the seal member outwardly into sealing engagement with the truck.

4. A dock assembly as set forth in claim 3 wherein the resilient biasing member has an arcuate shape.

5. A dock seal assembly for use with a truck parked adjacent a dock opening in a building wall and the dock opening defined by a top side and opposing side walls, the truck having a roof and a rear peripheral edge, the seal comprising:

a curtain member mounted adjacent the top side of the dock opening and substantially spanning the width of the dock opening so as to form a cover between a gap formed between the truck and the building wall, a gutter member attached to the curtain member so as to collect water runoff from the curtain member and deflect the water away from the roof of the truck and the dock opening, and a resilient, compressible seal member pivotally suspended adjacent the top side of the dock opening so as to engage the truck wherein the seal member has a front face adapted to sealably engage the edge of the truck and a reinforcement member disposed inside the seal member and along at least a portion of the width of the seal member to prevent sagging of the seal member.

6. A dock seal assembly as set forth in claim 5 wherein the gutter member has opposing ends which are spaced wider than the side walls of the dock opening to prevent water from infiltrating the dock opening.

7. A dock seal assembly as set forth in claim 5 comprising a resilient biasing member disposed between the seal member and the wall, one end of said biasing member engaging the seal member so as to bias the seal member outwardly into sealing engagement with the truck.

8. A dock seal assembly as set forth in claim 5 wherein the curtain member is operatively mounted to the building wall and extends outwardly from the building wall.

9. A dock seal assembly as set forth in claim 8 comprising a plurality of stays which extend outwardly from the building wall to support the curtain member.

10. A dock seal member as set forth in claim 5 wherein the curtain member is a first curtain member and the seal member is attached to a second curtain member which is suspended from the first curtain member.

11. A dock seal assembly as set forth in claim 10 wherein the seal member has a triangular cross section defined by the front face which is adapted to sealably engage the truck and two side faces which are adapted to be attached to the second curtain member.

12. A dock seal assembly for use with a truck parked adjacent a dock opening in a building wall and the dock opening defined by a top side and opposing side walls, the truck having a roof and a rear peripheral edge, the seal comprising:

a curtain member mounted adjacent the top side of the dock opening and substantially spanning the width of the dock opening so as to form a cover between a gap formed between the truck and the building wall and a resilient, compressible seal member attached to the curtain member and pivotally suspended from the top side of the dock opening so as to engage the truck wherein the seal member has a front face adapted to sealably engage the edge of the truck and a reinforcement member disposed in the seal member and along at least a portion of the width of the seal member to prevent sagging of the seal member.

13. A dock seal assembly as set forth in claim 12 wherein the curtain member is operatively mounted to the building wall and extends outwardly from the building wall.

14. A dock seal assembly as set forth in claim 13 comprising a plurality of stays which extend outwardly from the building wall to support the curtain member.

15. A dock seal assembly as set forth in claim 12 comprising a resilient biasing member disposed between the seal member and the wall, one end of said biasing member engaging the seal member so as to bias the seal member outwardly into sealing engagement with the truck.

16. A dock seal assembly as set forth in claim 15 wherein the resilient biasing member has an arcuate shape.

17. A dock seal assembly for use with a truck parked adjacent a dock opening in a building wall and the dock opening defined by a top side and opposing side walls, the truck having a roof and a rear peripheral edge, the seal comprising:

a first curtain member mounted adjacent the top side of the dock opening and substantially spanning the width of the dock opening so as to form a cover between a gap formed between the truck and the building wall, a gutter member attached to the curtain member so as to collect water runoff from the curtain member and deflect the water away from the roof of the truck and the dock opening, and a resilient, compressible seal member attached to a second curtain member which is suspended from the first curtain member so as to engage the truck wherein the seal member has a front face adapted to sealably engage the edge of the truck and a back face.

18. A dock seal assembly as set forth in claim 17 wherein the seal member has a triangular cross section defined by the front face which is adapted to sealably engage the truck and two side faces which are adapted to be attached to the second curtain member.

* * * * *